US009729515B1

(12) United States Patent
Anantharaju

(10) Patent No.: US 9,729,515 B1
(45) Date of Patent: Aug. 8, 2017

(54) SYSTEM AND METHOD FOR MANAGING SECURE COMMUNICATIONS FOR A VIRTUAL MACHINE INFRASTRUCTURE

(71) Applicant: Girish Anantharaju, San Jose, CA (US)

(72) Inventor: Girish Anantharaju, San Jose, CA (US)

(73) Assignee: CA, Inc., New York, NY (US)

( * ) Notice: Subject to any disclaimer, the term of this patent is extended or adjusted under 35 U.S.C. 154(b) by 626 days.

(21) Appl. No.: 13/890,091

(22) Filed: May 8, 2013

(51) Int. Cl.
*H04L 29/06* (2006.01)

(52) U.S. Cl.
CPC .......... *H04L 63/04* (2013.01); *H04L 63/0876* (2013.01); *H04L 63/0428* (2013.01); *H04L 63/06* (2013.01); *H04L 63/08* (2013.01); *H04L 63/10* (2013.01); *H04L 63/20* (2013.01)

(58) Field of Classification Search
CPC ......... H04L 63/08; H04L 63/10; H04L 63/20; H04L 29/06; H04L 63/0428
USPC .......................................................... 726/3
See application file for complete search history.

(56) References Cited

U.S. PATENT DOCUMENTS

| | | | | |
|---|---|---|---|---|
| 8,504,697 B2* | 8/2013 | Larson et al. | ................ | 709/227 |
| 8,613,070 B1* | 12/2013 | Borzycki | ............ | G06F 21/6218 |
| | | | | 726/8 |
| 2006/0215576 A1* | 9/2006 | Yu et al. | ........................ | 370/252 |
| 2007/0171921 A1* | 7/2007 | Wookey et al. | ............. | 370/401 |
| 2007/0180493 A1* | 8/2007 | Croft | ..................... | G06F 3/1415 |
| | | | | 726/2 |
| 2009/0307486 A1* | 12/2009 | Grajek et al. | ................. | 713/156 |
| 2010/0242092 A1* | 9/2010 | Harris et al. | ...................... | 726/3 |
| 2012/0096271 A1* | 4/2012 | Ramarathinam et al. | .... | 713/172 |
| 2014/0109174 A1* | 4/2014 | Barton et al. | .................... | 726/1 |

* cited by examiner

*Primary Examiner* — Carl Colin
*Assistant Examiner* — Gary Lavelle
(74) *Attorney, Agent, or Firm* — Coats & Bennett, PLLC

(57) ABSTRACT

A network server generates and allocates operating environments to trusted user agents executing on a client device. Each operating environment is generated responsive to a request to establish a secure communications session between a trusted user agent and a user-level application executing on a secure application server at a secure site, and comprises the software and/or hardware components that are necessary for maintaining that secure session. The network server monitors the secure communications session and deletes the operating environment upon detecting that the secure communications session has terminated.

20 Claims, 6 Drawing Sheets

SYSTEM AND METHOD FOR MANAGING SECURE COMMUNICATIONS FOR A VIRTUAL MACHINE INFRASTRUCTURE

BACKGROUND

The present disclosure relates to computer systems, and more specifically, to systems and computer-implemented methods for establishing and managing secure communications between an application server and a trusted user agent executing on a remote client device.

Providing secure communications between application servers and remote client devices has always been challenging. For example, the communications between user devices and a secure site (e.g., an application server operated by a financial institution), are subject to an increasing number of malicious eavesdropping techniques. In one particular technique known as "phishing," the malicious party may first direct the user device to a fake website that has the same "look and feel" as the secure site. Duped into thinking that he or she is communicating with an authorized application server at the secure site, the user enters private information (e.g., usernames, passwords, credit card information, etc.). The malicious party then captures that information for later unauthorized uses.

There are different techniques that help to make communications between two devices more secure. However, many of the known techniques focus on securing the user-level applications executing at the user device, such as browser applications, for example. Further, despite these attempts at increasing security, user-level applications are still the "weakest link" in a communications session. Thus, users and their client devices remain susceptible to the viruses and malware used by malicious third parties to steal private data.

BRIEF SUMMARY

The present disclosure provides a method and apparatus for managing secure communications with a trusted user agent executing at a client device. In one aspect, a network control server is disposed in a network between the client device and an application server that hosts secure user applications. Such applications may comprise, for example, a website operated by a financial institution (e.g., a bank) that provides a user with access to his/her accounts.

According to one or more aspects of the present disclosure, the network control server dynamically generates and allocates an operating environment for a user agent responsive to receiving a connection request from a client device. The operating environment comprises operating system components utilized by the user agent to communicate with an application server via a secure communications session.

In operation, the network control server establishes a first bi-directional communications link between the operating environment and the user agent in a first security domain, and a second bi-directional communications link between the operating environment and the application server in a second security domain. Once the session is established, the operating environment functions as an intermediary to communicate data between the trusted user agent and the application server via the first and second bi-directional communications links. For example, the operating environment may translate the data between the first and second security domains such that the trusted user agent and the application server can communicate with each other.

The network control server monitors the secure communication session and, responsive to detecting that the session is terminated, deletes the operating environment. Thereafter, if a user agent requests a secure connection, the network control server will dynamically generate and allocate a new operating environment.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
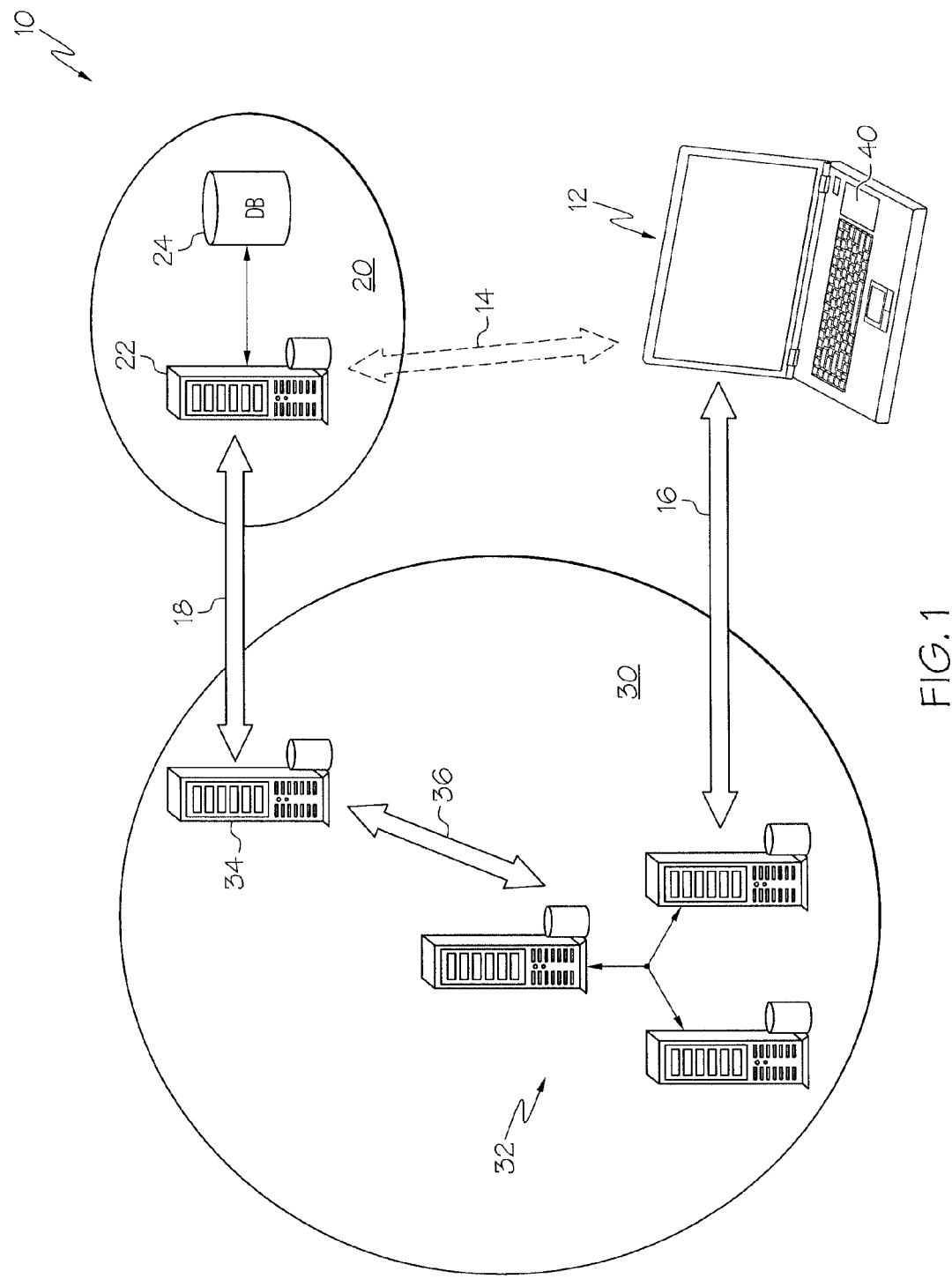
FIG. 1 is a block diagram illustrating a communications system configured to operate according to one aspect of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a system and computer-implemented method for establishing a secure communications session between a trusted user agent executing on a user's client device and a user application executing on an application server at a secure site (e.g., a website operated by a financial institution). Particularly, the system and method provided herein prohibit communications directly between the trusted user agent and the application server, as is conventional, and instead, direct all communications between these entities through an intermediary control server residing in the Cloud.

To accomplish this, the present disclosure disposes the control server in the Cloud between the client device and the application server. The control server is configured to generate "operating environments" for allocation to the trusted user agents. Each "operating environment" is a stand-alone resource comprising all the necessary operating system (OS) components, software, and/or hardware resources utilized by the trusted user agent to communicate data in a secure manner with a specific application running on the application server.

According to one or more aspects of the present disclosure, the control server creates and then allocates an operating environment to a trusted user agent upon receiving a request from that agent to communicate with the secure application. A new operating environment is created and allocated to a given trusted user agent each time a request is made to communicate with a secure application running on the application server. Further, the operating environment is created and initialized only for use by the requesting trusted user agent, and will not communicate with any other user agent so long as it remains allocated to the requesting trusted user agent. Once allocated, however, the operating environment executes at the control server and establishes respective secure communications links with both the trusted user agent and the user application at the application server. The allocated operating environment then obtains data from the user application for display to the user via the trusted user agent, and receives user input from the trusted user agent for communication to the secure application.

The trusted user agent does not communicate data or information directly with the application server, but instead, communicates data only with its allocated operating environment at the control server. Therefore, the allocated operating environment functions as a "virtual machine" thereby allowing a user of the client device to communicate securely with the application server. Once the trusted user agent signals the end of the communications session with the application server, the allocated operating environment is deleted or deallocated. That is, the OS components, software, and/or hardware resources that were allocated when the operating environment was created are released back to their respective resource pools. No OS states are saved in memory, and all data associated with the operating environment is deleted. Thereafter, if the same or different trusted user agent sends a request to communicate with the secure application, the control server would generate and allocate an entirely new operating environment to include all the requisite software and hardware resources to the trusted user agent.

By establishing a secure communications session using the method described herein, operators of the secure sites that host the user applications can better ensure communications security with the client device across multiple networks. For example, many conventional methods for securing two-way communications rely on the ability to secure the client device's OS and/or the communications links established with those client devices. However, as stated above, these conventional methods may not adequately secure the communications. Therefore, the present disclosure provides client devices with a unique, newly-initialized operating environment (i.e., virtual machine) each time the device requests to connect with the application at the secure site to help protect against malicious attempts at stealing a user's private data.

Referring now to the drawings, FIG. 1 is a block diagram illustrating a system 10 configured to provide a secure communications session in accordance with one or more aspects of the present disclosure. System 10 comprises a client device 12 and a pair of interconnected computer networks 20, 30. Generally, computer network 20 comprises a secure computer network operated by, or associated with, a financial institution, for example, or some other party that maintains private data for a user. Such parties include, but are not limited to, those that maintain document repositories, employers at workplaces, and merchants that maintain commercial websites. Network 30, however, comprises any privately or publically operated computer network, such as the Internet. As is conventional, client device 12 may communicate data and information with one or more application severs residing in the secure network 20 via an established communications link 14. However, according to aspects of the present disclosure, the link 14 is not used to communicate data with network 20. Rather, the client device 12 communicates such data with the application servers in network 20 via network 30 and communications links 16, 18.

Client device 12 comprises well-known components, such as a programmable microprocessor, memory storage, a user input interface (e.g., a keyboard), and a display, that allow the client device 12 to store, execute, and interact with a variety of different software applications. One such application is a trusted user agent 40. As described in more detail later, the trusted user agent 40 contains the logic and instructions that facilitate the secure communications with the application server in secure network 20 via one or more intermediary control servers disposed in network 30.

The client device 12, in this aspect, comprises a laptop computing device; however, those of ordinary skill in the art should appreciate that this is for illustrative purposes only. Client device 12 may be any type of end-user communications device capable of communicating with one or more servers in networks 20, 30 via wireless and/or wireline means. Such devices include, but are not limited to, desktop, notebook, and tablet computing devices and cellular communications devices (e.g., cellular telephones).

Network 20, as stated above, comprises a secure computing network that hosts applications accessible only to users that are authorized access. Generally, secure network 20 will comprise one or more application servers 22 that communicate data with a data storage device 24 using any well-known query-response protocol. The application server 22 may comprise a computer server having one or more programmable processors and is capable of communicating data and other information with multiple client devices 12. Such communications may be via link 14, as is conventional, or as stated above, in accordance with one or more aspects of the present disclosure via network 30 and links 16, 18.

Typically, the secure application server 22 is maintained and operated by a managed service provider (MSP) such as a business or financial institution, for example, and executes secure user-level applications. From time-to-time, the user may access these applications, and they may require the user to enter private data. The private data may comprise, by way of example only, username/password combinations, financial data, business data, as well as multimedia data such as images, video, and documents. The private data may be stored in the data storage device 24 and retrieved by the application server 22 as necessary.

As stated above, user devices such as client device 12 conventionally communicate data and information with the application server 22 via a communications link 14. However, such conventional communication methods may leave the client device 12 susceptible to eavesdropping attacks by malicious third parties. Therefore, rather than establish the communications link 14 with secure network 20, the client device 12, in accordance with one or more aspects of the present disclosure, establishes a communications with application server 22 in network 14 via network 30.

Network 30 comprises a computer network, such as the Internet or a Cloud network, for example, having one or more intermediary control servers 32 communicatively connected to a proxy server 34. Network 30 is accessible to client device 12 via any of a variety of wireless and/or wireline means, and thus, may also include one or more access points (APs) (not shown). Such APs may include, but are not limited to, Wireless APs (WAPs) configured to operate according to any of the well-known IEEE 802.11x set of standards.

The proxy server 34 is a computer server that is generally not directly accessible to other user devices, but instead, permits connections only from specified or authorized communication servers and/or applications executing in network 30. Further, proxy server 34 may, according to some aspects, be maintained by the MSP to function as a gateway device. Particularly, the proxy server 34 communicates data and control signals with the application server 22 via the secure bi-directional communications link 18. However, neither the other servers in the network 30, nor the client devices connected to network 30, have such direct access to the application server 22. Instead, those devices that request to communicate with the application server 22 must do so via the proxy server 34.

One such device that communicates with the application server 22 via the proxy server 34 in accordance with the present disclosure are the control servers 32 disposed in network 30. The control servers 32 comprise one or more computer servers, and as seen later in more detail, each includes one or more programmable controllers and memory. Each control server 32 also comprises a network interface that provides the control servers 32 with the ability to communicate with other, remote devices, such as the client device 12 and proxy server 34, using well-known communications protocols. In operation, the control servers 32 select and allocate the resources that allow the trusted user agent 40 on client device 12 to communicate data and signals with a user application executing on the application server 22.

In more detail, the control servers 32 are configured to dynamically generate operating environments for allocation to the trusted user agents 40 responsive to receiving requests for such allocation by the trusted user agents 40. As previously stated, each operating environment is a predefined collection of software and/or hardware resources that a trusted user agent 40 executing on client device 12 needs to communicate with a given application executing on application server 22. Such resources may comprise, for example, a generic set of software and/or hardware resources (e.g., software applications and/or hardware circuits) that enable the trusted user agent 40 to communicate with many different types of applications executing on the application server 22. While in use, only the trusted user agent 40 that received the allocation can communicate with the application server 22 utilizing that allocated operating environment. All other trusted user agents 40 must request their own dynamically generated operating environment from control server 32, or if none are available, wait until a trusted user agent 40 relinquishes its allocated operating environment. Once the control server 32 deletes the newly-released operating environment, the control server 32 may utilize the newly released resources to generate and allocate a new operating environment to a requesting trusted user agent.

In other aspects of the present disclosure, the generation and allocation of any given operating environment for a trusted user agent 40 is based on the type of application that the trusted user agent 40 wishes to communicate with. In such cases, the control server 34 would dynamically generate and allocate different operating environments to contain different software and/or hardware resources that are particularly suited for a particular type of application.

By way of example only, a first operating environment may be dynamically generated by the control server 32 to contain the software and/or hardware resources that may be utilized by a trusted user agent 40 to communicate with a financial application executing on application server 22. However, a second, different operating environment may be dynamically generated by the control server 32 to contain the software and/or hardware resources that may be utilized by the trusted user agent 40 to download, view, and edit a document stored on application server 22. The control server 32 could also dynamically generate and allocate other operating environments to contain the software and/or hardware resources that may be utilized by a trusted user agent 40 to interact with different types of multimedia files (e.g., images, video, audio, etc.). Thus, in accordance with the present disclosure, the intermediary control servers 32 may dynamically generate and allocate various different operating environments, wherein each operating environment is dynamically configured responsive to receiving a request from a given trusted user agent to comprise the software and/or hardware resources particularly suited for a corresponding type of application associated with different types of multimedia files.

However, regardless of whether the operating environments are specific to a particular type of user application executing on application server 22, or are generic so as to operate with a variety of different types of user applications executing on application server 22, the operating environments maintained at the control servers 32 are dynamically allocated to a trusted user agent 40 upon request by that agent, are executed at the control server 32 to function as a virtual machine for that particular trusted user agent 40, and then deleted by the control server 32 when the trusted user agent 40 is finished with the session.

Figure 2:
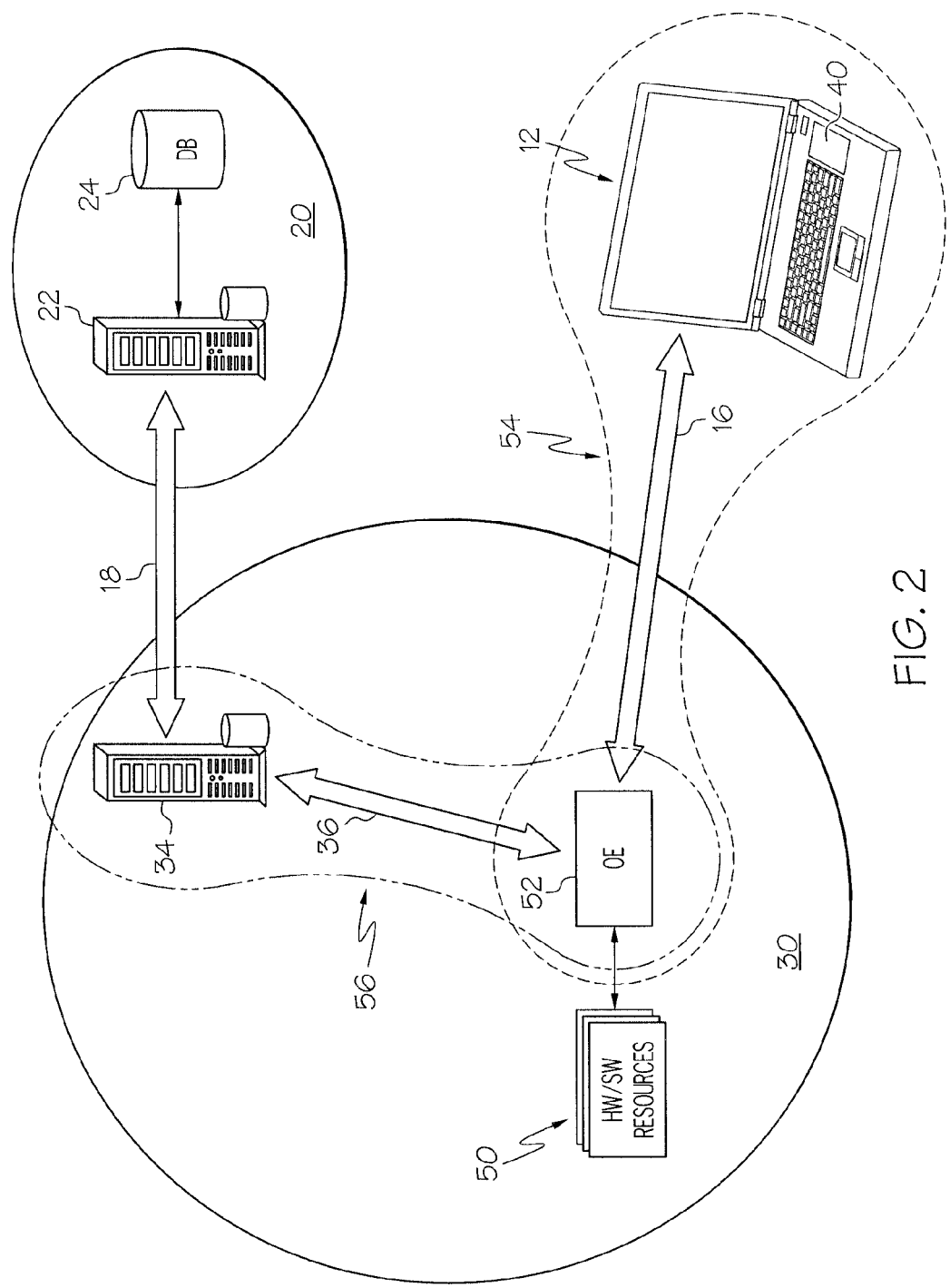
FIG. 2 is a block diagram illustrating the allocation of an operating environment to a client device according to one embodiment of the present disclosure.

FIG. 2 is a block diagram that illustrates a method of establishing a secure communications session between the client device 12 and the application server 22 according to one aspect of the present disclosure. As seen in FIG. 2, the control server 32 maintains pools of hardware and software resources 50. As previously stated, the control server 32 is configured to dynamically generate and allocate an operating environment 52 to comprise the software and/or hardware resources that a given trusted user agent 40 would need to communicate with a desired application executing on application server 22.

By way of example only, applications such as financial applications may require users to authenticate themselves prior to allowing access to the application features. Thus, an operating environment 52 generated for and allocated to the trusted user agent 40 may comprise the operating system components that facilitate communications between the trusted user agent 40 and the application executing on application server 22, as well as the software functions specifically designed to obtain a username/password combination from a user. In some aspects, the operating environment 52 may be dynamically generated to include hardware resources such as circuits specifically designed to authenticate a user based on user input, for example, or communication ports that facilitate the communications. As those of ordinary skill in the art will readily appreciate, other software and hardware circuits are also possible.

When a user wishes to establish communications with an application executing on the application server 22, the trusted user agent 40 sends a connection request to the control server 32. Upon receiving the request, a control application executing at the control server 32 generates an operating environment 52 for the trusted user agent 40. The control server 32 then initializes the newly generated operating environment to a "clean" or initialized state to provide a newly instantiated virtual machine for the trusted user agent 40 on client device 12. Once initialized, the control server 32 allocates the operating environment 52 to the trusted user agent 40 and establishes a secure communication session between the trusted user agent 40 and the application executing on application server 22.

More particularly, the operating environment 52 allocated to client device 12 establishes a first secure bi-directional communications link 16 with the trusted user agent 40 executing on client device 12. This first link 16 may be established according to known security procedures and protocols, and thus, is established in a first security domain 54. The operating environment 52 also establishes a second secure bi-directional communications link 36 with the proxy server 34. The second link 36 is established utilizing network-specific security procedures and protocols that are not generally available to client device 12, and thus, is established within a second security domain 56. When both links 16, 36 are established, the trusted user agent 40 executing on the client device 12 has a secure communications session with the application executing on the application server 22.

In operation, the trusted user agent 40 and the application executing on the application server 22 send data to each other via the allocated operating environment 52 executing on the control server 32. Upon receipt, the operating environment 52 translates the data between security domains 54, 56 using any means known in the art.

Particularly, in one embodiment, data, such as usernames and passwords, as well as user actions, such as mouse "clicks" and keystrokes, for example, are received at the allocated operating environment 52 from the trusted user agent 40 via link 16 in the first security domain 54. The data and user action indications may be communicated using, for example, using MICROSOFT'S Remote Desktop Protocol (RDP), the X Display Manager Control Protocol (XDMCP), or a Virtual Network Computing (VNC) protocol. Upon receipt, the OS component of the allocated operating environment 52 translates the user action indications and data into corresponding indications and data. These corresponding user indications and data are then sent to the application server 22 via proxy 34 and link 36 in the second security domain 56. For example, in some embodiments, the operating environment 52 sends the user indications and data to the application server 22 using the Transmission Control Protocol (TCP) or Secure Socket Layer (SSL).

Translation between security domains 54, 56 may also be performed by the operating environment 52 in the opposite direction. Particularly, data output by the application executing on application server 22 is sent to the operating environment 52 via security domain 56. As above, such data and information may be sent via TCP or SSL, for example. Upon receipt, the OS component of the allocated operating environment 52 translates the data and information into corresponding pixel data, and then sends that pixel data (e.g., via RDP, XDCMP, or VNC) to the trusted user agent 40 on client device 12 over link 16 and the first security domain 54 for display to a user. In some embodiments, the operating environment 52 may also send the actual data and information to the user agent 40. Thus, the allocated operating environment 52 binds the two security domains 54, 56. When the secure communications session is terminated, the links 16, 36 are torn down, and the allocated operating environment 52 along with its associated resources and data is deleted.

Figure 3A:
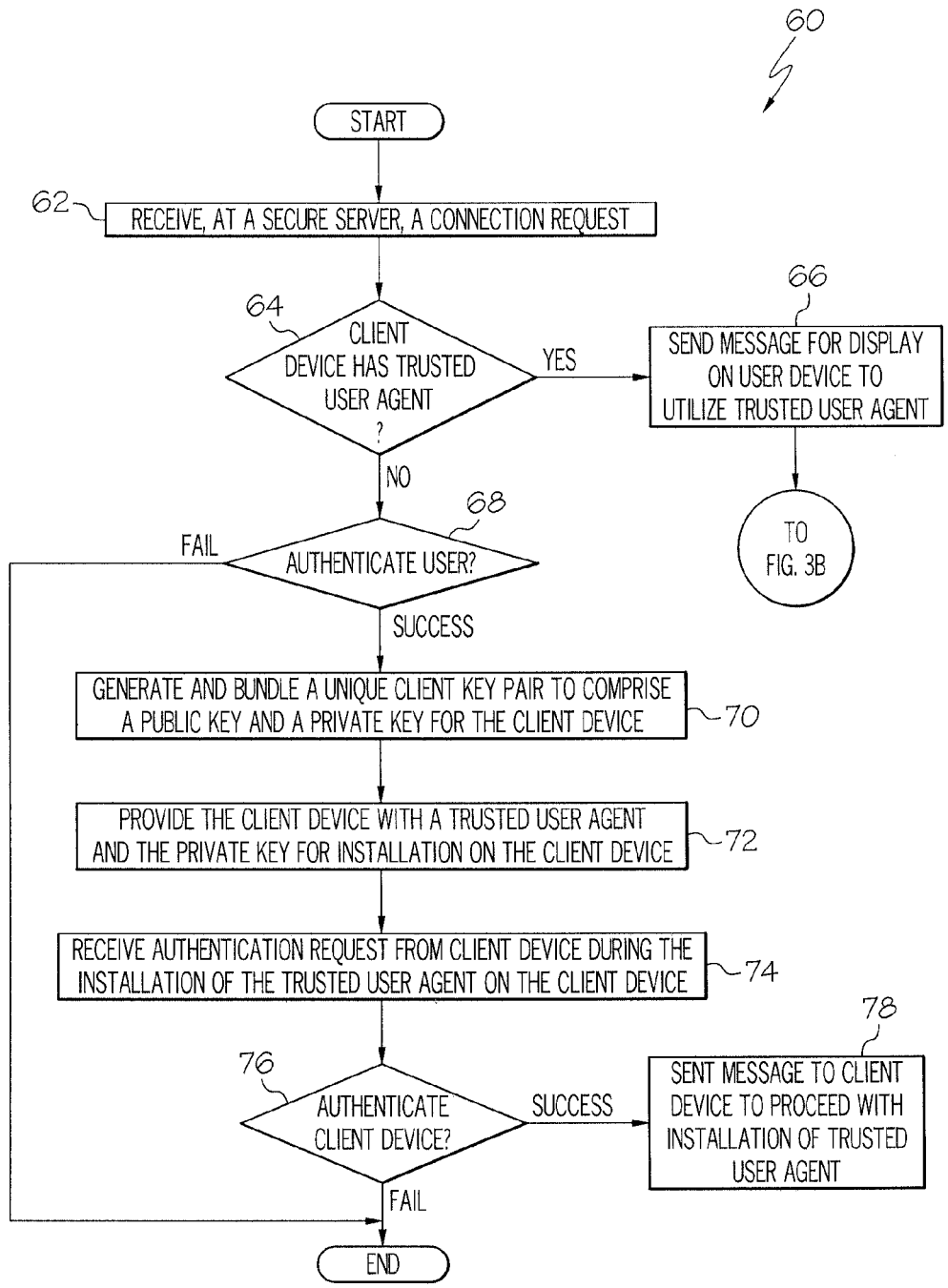
FIGS. 3A-3C are flow diagrams illustrating a method for allocating and de-allocating an operating environment according to one aspect of the present disclosure.
Figure 3B:
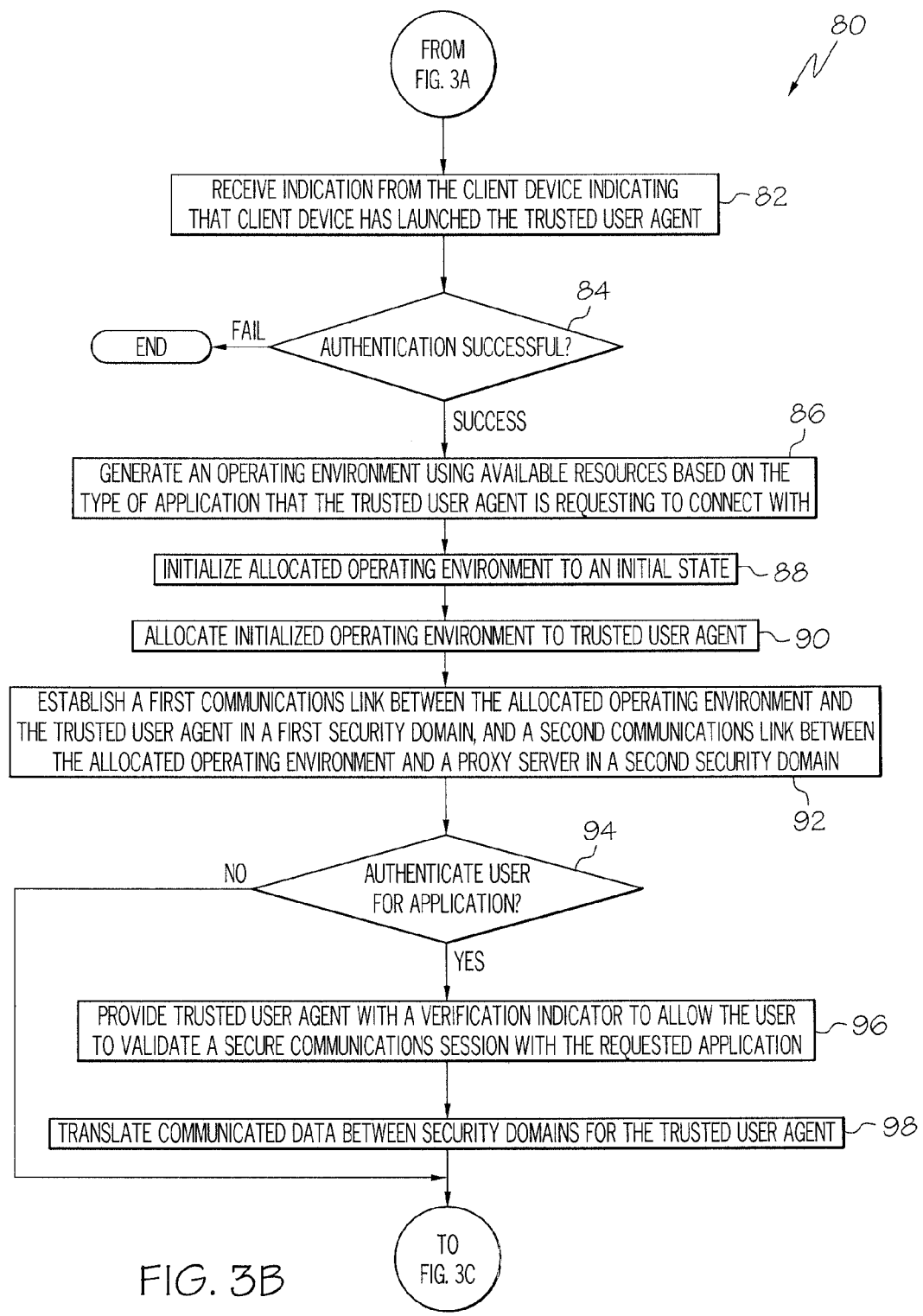
Figure 3C:
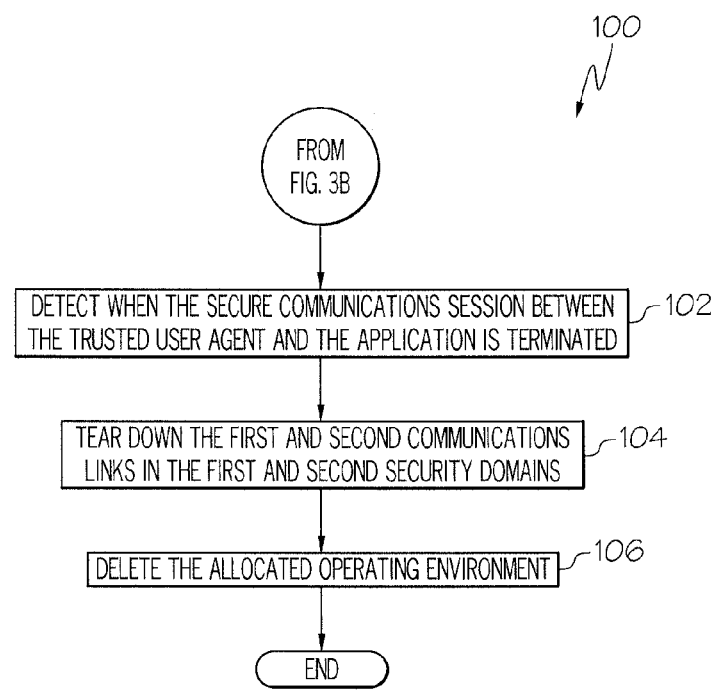

FIGS. 3A-3C are flow diagrams illustrating a method by which a secure communications session may be established between a trusted user agent 40 executing on the client device 12 and an application executing at the application server 22 according to one or more aspects of the present disclosure. Method 60, seen in FIG. 3A, begins when the control server 32 receives a connection request message (box 62). The connection request message may be sent, for example, by the client device 12, or by the application server 22 in response to an attempt by the client device 12 to access the application server 22 directly via a conventionally established communications link 14. Particularly, because the present disclosure prohibits such "direct" communications between the client device 12 and the application server 22 (i.e., without communicating through the control server 32), the application server 22, upon detecting such an access attempt, will simply forward a connection request message to the control server 32. In another aspect, however, the application server 22 will return a message to the client device 12 causing the client device 12 to generate and send the connection request message to the control server 32.

Regardless from where the message is received, the connection request message may include any information needed or desired. However, the message will generally include an indicator or identifier, such as a Uniform Resource Locator (URL), for example that identifies a specific application executing on application server 22. The connection request message may also carry an identifier to identify the client device 12, and indicate an address of a port over which the client device 12 wishes to communicate data.

Upon receiving the request, the control application executing at the control server 32 first determines whether the client device 12 has a trusted user agent 40 already installed (box 64). This may be determined, for example, by comparing an identifier of the client device 12 that is received with the connection request to a stored list of authorized client devices 12 accessible to the control server 32. If the control server 32 determines that the client device 12 already has a trusted user agent 40 installed, the control server 32 may generate a dialog message and send it to the client device 12 to inform the user to launch the trusted user agent 40 when communicating with the desired application (box 66). Otherwise, the client device 12 will have to download and install the trusted user agent 40 from the control server 32 before proceeding further using an installation process facilitated by one aspect of the present disclosure.

Particularly, the control server 32 would first authenticate the user to ensure that the user is authorized to download the trusted user agent 40 (box 68). Authentication may be based on any known method, but in one aspect, authentication is based on a unique password pre-provisioned by the MSP. If the authentication fails, method 60 ends and the client device 12 that initiated the request is denied access to the application server 32. However, if the authentication succeeds, the control application at the control server 32 would generate a unique client key pair for the client device 12 (box 70). The key pair may be generated based on information received with the connection request message, for example, and comprise a private key and a public key. Once generated, the control server 32 stores the keys in a secure area of memory and associates the keys with the identity of the client device 12. The control application at the control server 32 then bundles the keys with a copy of the trusted user agent application and sends the bundle to the client device (box 72).

The client device 12, upon receipt of the bundle, installs the trusted user agent application. However, during the installation process, the control server 32 will once again authenticate the client device 12 to ensure that device 12 is the proper client device on which to install the trusted user agent 40. More particularly, the control server 32 will receive an authentication request from the client device 12 as client device 12 installs the trusted user agent 40 (box 74). Included with the request is information about the client device 12 (e.g., the identity of the client device 12 and/or other information as needed or desired). Upon receipt of the request, the control application executing on the control server 32 compares the received information with data stored in memory to determine whether there is a match (box 76). If the control application determines that the information received from client device 12 does not match the stored data, the authentication fails and the process ends. If there is a match, however, authentication succeeds, and a return message may be sent instructing the client device 12 to complete the installation (box 78). In response to receiving the message, the client device 12 would complete the installation process, and thereafter, be configured to access the application server 20 via an allocated operating environment 42.

FIG. 3B illustrates one method 80 for allocating an operating environment 52 to a trusted user agent 40 according to one aspect of the present disclosure. Method 80 begins with the control application executing at the control server 32 receiving an indication from the client device 12 that the client device 12 has launched the trusted user agent 40 (box 82). The indication may be, for example, a value that was encrypted using the private key that was generated at the control server 32, or an authorization code that was generated for, and returned to, the trusted user agent 40 during the installation process. In any event, the control server 32 will utilize the received indicator to authenticate the trusted user agent 40. Additionally, the control server 32 may also send its own indicator (e.g., a value using the control server's private key) to the trusted user agent 40 to allow the trusted user agent 40 to authenticate the control application executing at the control server 32. (box 84). Such mutual authentication may be performed using any known means, but in one embodiment, authentication is performed using bi-directional Secure Socket Layer (SSL) communication. A failed authentication will cause method 80 to end. However, a successful authentication will cause the control application executing at the control server 32 to dynamically generate and allocate an operating environment 52 to the newly-authenticated trusted user agent 40.

Once authentication succeeds, the control application will dynamically generate or create an operating environment 52 using the available resources 50 (box 86). The operating environment 52 is created only for the requesting trusted user agent 40, and as such, is dedicated for use only by that trusted user agent 40.

The creation of an operating environment 52 may be accomplished based on any criteria needed or desired. In one aspect, for example, an operating environment 52 is created to comprise the resources required based on an expected usage. In another aspect, however, the operating environment 52 is created based on a type of application the trusted user agent 40 will access. For example, if the trusted user agent 40 requests to connect to a financial application executing on application server 22, such as a personal banking application provided by a financial institution, the operating environment 52 would be generated dynamically using resources 50 specifically configured for use with such financial applications. In such embodiments, each operating environment 52 would include all the operating system components, software, and/or hardware resources that the trusted user agent 40 may utilize to communicate with the particular financial application. As another example, if the user desires to edit a secure document, the operating environment 52 may be generated dynamically using resources 50 that include the OS components, software, and/or hardware components that may be utilized to edit such documents.

Regardless of the type of application the trusted user agent 40 desires to communicate with, the resources 50 for each operating environment 52 will also comprise the software and/or hardware components that are required to communicate with both the user application on application server 22, and the trusted user agent 40 executing on client device 12, as well as those software and/or hardware resources that may be utilized by the dynamically generated operating environment 52 to translate data and information between the first and second security domains 54, 56, as previously described. Such components include, but are not limited to, operating system components, communication components, and hardware circuitry configured to perform selected functions (e.g., authentication).

Once the operating environment has been created, the control application at the control server 32 may initialize the allocated operating environment 52 to an initial state (box 88) before allocating the operating environment 52 to the trusted user agent 40 (box 90). This is to ensure that the trusted user agent 40 is allocated a "clean" operating environment 52. The operating environment 52 then establishes a pair of communications links 16, 36. More particularly, the control application establishes the first communications link 16 between the allocated operating environment 52 and the trusted user agent 40 in the first security domain 54, and the second communications link 36 between the allocated operating environment 52 and the proxy server 34 in the second security domain 56 (box 92).

Once the communications links 16, 36 have been established, the control application at the control server 32 may authenticate the user, such as by using a username/password combination, as known in the art (box 94). Provided authentication succeeds, the control application may send the trusted user agent 40 a verification indicator (e.g., an image or wallpaper pre-selected by the user) to allow the user to verify the secure communications session established with the application server 22 (box 96). Thereafter, the operating environment 52 allocated to the trusted user agent 40 translates data and information between security domains 54, 56 (box 98), as previously described.

As seen in method 100 of FIG. 3C, once the user is finished communicating data and information with the application on application server 22, the allocated operating environment 52 is de-allocated and deleted. More particularly, the control application executing at the control server 32 monitors the communications between the operating environment 52 and the trusted user agent 40, and detects when the secure communications session is terminated (box 102). For example, the user may terminate the session by logging out of the application executing on application server 22. The control application then tears down the first and second communications links 16, 36 (box 104) and deletes the allocated operating environment 52 (box 106). This de-allocates the resources used for the operating environment 52 so that they may be reused for dynamically creating subsequent operating environments 52, and ensures that any user data that was created during the communications session is not saved, but instead, is deleted.

Figure 4:
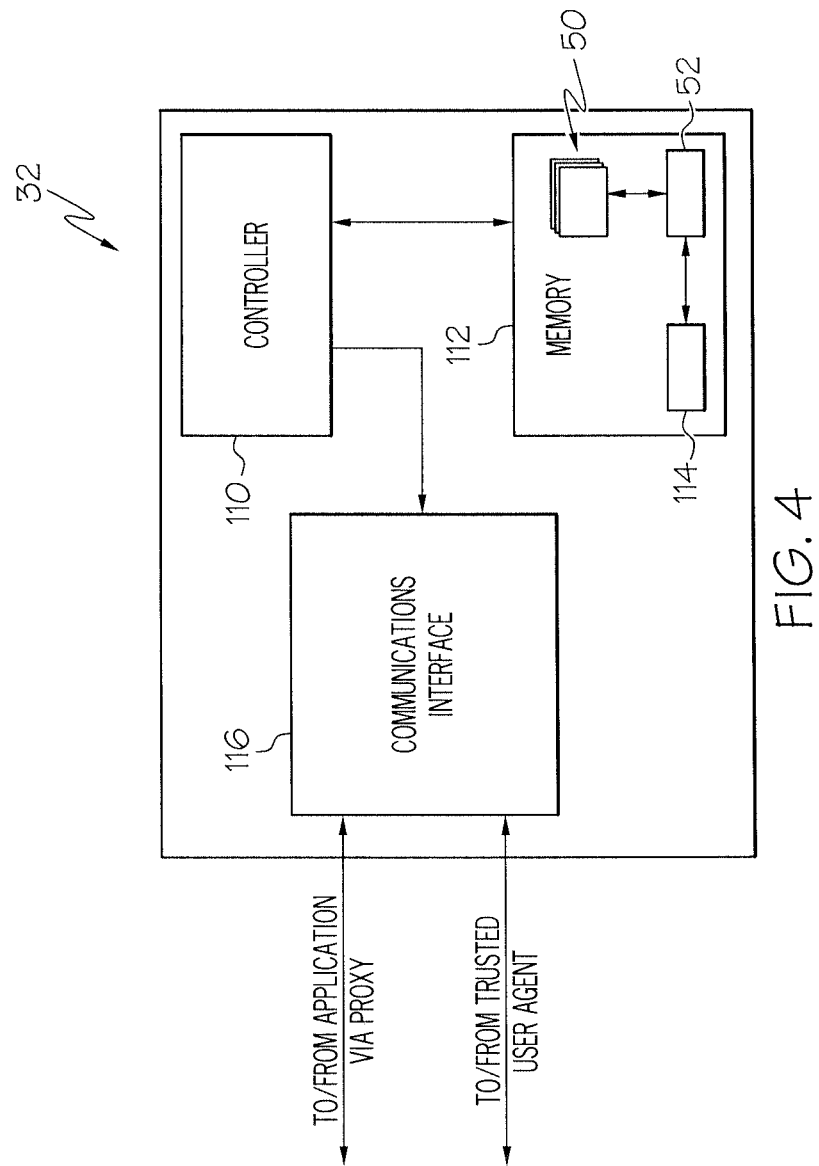
FIG. 4 is a block diagram illustrating some component parts of a network control server device configured to allocate and de-allocate operating environments according to one aspect of the present disclosure.

FIG. 4 is a block diagram illustrating some component parts of a control server 32 configured to dynamically generate and allocate operating environments 52 in accordance with one or more aspects of the present disclosure. As seen in FIG. 4, the control server 32 comprises a programmable controller 110, a memory 112, and a communications interface 116. The programmable controller 110 may be implemented by one or more microprocessors, hardware, firmware, or a combination thereof, and generally controls the operation and functions of the control server 32 according to the appropriate standards. Such operations and functions include, but are not limited to, communicating with the trusted user agent 40 executing on client device 12, communicating with the application executing application server 22 via proxy 34, establishing first and second independent communications links 16, 36 in first and second independent security domains 54, 56, translating data communicated between the different security domains 54, 56, and dynamically generating and allocating operating environments 52 to the trusted user agents 40 according to the embodiments as previously described.

The memory 112 may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 112 stores programs and instructions, such as control application 114 and one or more sets 50 of operating environments 52. The control application 114, when executed by controller 110, dynamically generates and allocates operating environments 52 using available software and/or hardware resources 50 responsive to receiving requests from the trusted user agents 40. The control application 114 then monitors the communications between the allocated operating environments 52 and their respective trusted user agents 40. When the control application 114 determines that a given user has terminated the secure communications session, the control application 114 deletes the operating environment 52 allocated to the trusted user agent 40 associated with that user as previously described.

The communications interface 116 comprises a transceiver or other communications interface known in the art that facilitates the communications with one or more remote parties over a communications network. Such an interface may comprise, for example, an ETHERNET component capable of communicating data and information over a communications network as is known in the art. In one aspect, the controller 110, in accordance with the instructions in the control application 114, generates and sends messages to one or more other servers, such as proxy server 34 and application server 22, via the communications interface 116. The control application 110 also generates and sends messages to the trusted user agent 40 via the communications interface 116.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method, performed at a network server device disposed between a client device and an application server, the method comprising:
   at a processing circuit in the network server device:
      receiving a connection request from the client device to communicate with an application executing at the application server via a secure communications session;
      determining an application type for the application executing at the application server based on information included in the connection request;
      dynamically generating and allocating a dedicated operating environment for a user agent executing on the client device based on the determined application type, wherein the operating environment is dedicated to the user agent and comprises software and hardware components utilized by the user agent to communicate with the application via the secure communications session;
      establishing a first bi-directional communications link between the operating environment and the user agent in a first security domain;
      establishing a second bi-directional communications link between the operating environment and the application server in a second security domain;
      communicating data between the user agent and the application server via the first and second bi-directional communications links, wherein communicating the data comprises the operating environment translating the data between the first and second security domains; and
      deallocating the operating environment responsive to detecting termination of the secure communications session.

2. The method of claim 1 wherein dynamically generating and allocating the operating environment comprises:
   creating the operating environment to comprise a selected set of available resources;
   initializing the operating environment to an initial state for the user agent; and
   allocating the initialized operating environment to the user agent.

3. The method of claim 2 further comprising:
   selecting the set of available resources with which to generate the operating environment based on the determined application type.

4. The method of claim 1 wherein deallocating the operating environment responsive to detecting termination of the secure communications session comprises deallocating the operating environment from a memory circuit responsive to detecting that the secure communications session has been terminated.

5. The method of claim 1 further comprising:
   determining whether the user agent is already installed on the client device; and
   if the user agent is not installed on the client device, installing the user agent on the client device.

6. The method of claim 5 wherein installing the user agent on the client device comprises:
   authenticating the client device;

if the authentication is successful, generating a client key pair unique to the user agent to be installed on the client device, wherein the client key pair comprises a private key and a public key;

storing the public key in a memory accessible to the network server device; and providing the private key and the user agent to the client device for installation on the client device.

7. The method of claim 1 wherein the connection request received from the client device includes an indicator identifying the user agent, and wherein dynamically generating and allocating an operating environment to a user agent further comprises:

authenticating the user agent based on the received indicator; and creating the operating environment for allocation to the user agent based on the result of the authentication.

8. The method of claim 7 further comprising sending an authentication indicator to the user agent, wherein the authentication indicator authenticates the network server device to the user agent.

9. A network server device disposed between a client device and an application server, the network server device comprising:

a communications interface circuit configured to communicate with a user agent installed on the client device and the application server; and a programmable processing circuit communicatively connected to the communications interface circuit and configured to:

receive a connection request from the client device to communicate with an application executing at the application server via a secure communications session;

determine an application type for the application executing at the application server based on information included in the connection request;

dynamically generate and allocate a dedicated operating environment for the user agent based on the determined application type, wherein the operating environment is dedicated for use by the user agent and comprises software and hardware components utilized by the user agent to communicate with the application via the secure communications session;

establish a first bi-directional communications link between the operating environment and the user agent in a first security domain;

establish a second bi-directional communications link between the operating environment and the application server in a second security domain;

communicate data between the user agent and the application server via the first and second bi-directional communications links, wherein communicating the data comprises the operating environment translating the data between the first and second security domains; and deallocate the operating environment responsive to detecting termination of the secure communications session.

10. The server of claim 9 wherein to dynamically generate and allocate the operating environment, the processing circuit is further configured to:

create the operating environment to comprise a selected set of available resources;

initialize the generated operating environment to an initial state for the user agent; and allocate the initialized operating environment to the user agent.

11. The server of claim 10 wherein to dynamically generate and allocate the operating environment, the processing circuit is further configured to:

select the set of available resources with which to generate the operating environment based on the determined application type.

12. The server of claim 9 wherein to deallocate the operating environment, the processing circuit is further configured to deallocate the operating environment from a memory circuit responsive to detecting that the secure communications session has been terminated.

13. The server of claim 9 wherein the controller is further processing circuit to:

determine whether the user agent is already installed on the client device; and if the user agent is not installed on the client device, install the user agent on the client device.

14. The server of claim 13 wherein to install the user agent on the client device, the processing circuit is configured to:

authenticate the client device;

if the authentication is successful, generate a client key pair unique to the user agent to be installed on the client device, wherein the client key comprises a private key and a public key;

store the public key in a memory circuit accessible to the network server device; and provide the private key and the user agent to the client device for installation on the client device.

15. The server of claim 9 wherein the connection request received from the client device includes an indicator identifying the user agent, and wherein to dynamically generate and allocate the operating environment, the processing circuit is further configured to:

authenticate the user agent based on the received indicator; and generate the operating environment for allocation to the user agent based on the result of the authentication.

16. The server of claim 9 wherein the processing circuit is further configured to send an authentication indicator to the user agent, wherein the authentication indicator authenticates the server to the user agent.

17. A computer program product comprising:

a non-transitory computer readable storage medium configured to store a control application that, when executed by a processing circuit on a network server device disposed between a client device and an application server, configures the processing circuit to:

receive a connection request from the client device to communicate with an application executing at the application server via a secure communications session;

determine an application type for the application executing at the application server based on information included in the connection request;

dynamically generate and allocate a dedicated operating environment for the user agent based on the determined application type, wherein the operating environment is dedicated for use by the user agent and comprises software and hardware components utilized by the user agent to communicate with the application via the secure communications session;

establish a first bi-directional communications link between the operating environment and the user agent in a first security domain;

establish a second bi-directional communications link between the operating environment and the application server in a second security domain;

communicate data between the user agent and the application server via the first and second bi-directional communications links, wherein to communicate the data, the control application causes the programmable controller to translate the data between the first and second security domains; and deallocate the operating environment responsive to detecting termination of the secure communications session.

18. The computer program product of claim 17 wherein to dynamically generate and allocate the operating environment, the control application further configures the processing circuit to:

create the operating environment to comprise a selected set of available resources based on the determined application type;

initialize the operating environment to an initial state for the user agent; and allocate the initialized operating environment to the user agent.

19. The computer program product of claim 17 wherein the control application further configures the processing circuit to:

determine whether the user agent is already installed on the client device; and if the user agent is not installed on the client device, install the user agent on the client device.

20. The computer program product of claim 19 wherein to install the user agent on the client device, the processing circuit is configured to:

authenticate the client device;

if the authentication is successful, generate a client key pair unique to the user agent to be installed on the client device, wherein the client key comprises a private key and a public key;

store the public key in a memory accessible to the network server device; and provide the private key and the user agent to the client device for installation on the client device.

* * * * *